(12) United States Patent
Murakami et al.

(10) Patent No.: US 7,269,499 B2
(45) Date of Patent: Sep. 11, 2007

(54) ENGINE STARTING AND STOPPING CONTROL DEVICE

(75) Inventors: Yoshifumi Murakami, Obu (JP); Seiichirou Nishikawa, Okazaki (JP)

(73) Assignee: Denso Corporation, Kariya, Aichi-pref. (JP)

( * ) Notice: Subject to any disclaimer, the term of this patent is extended or adjusted under 35 U.S.C. 154(b) by 307 days.

(21) Appl. No.: 11/100,410

(22) Filed: Apr. 7, 2005

(65) Prior Publication Data

US 2005/0228575 A1    Oct. 13, 2005

(30) Foreign Application Priority Data

Apr. 8, 2004    (JP) .............................. 2004-114439

(51) Int. Cl.
*F02D 45/00* (2006.01)
(52) U.S. Cl. ..................................................... 701/112
(58) Field of Classification Search ................ 701/113, 701/112, 102, 115; 123/179.5, 179.6, 179.15, 123/179.16, 179.17, 198 DB
See application file for complete search history.

(56) References Cited

U.S. PATENT DOCUMENTS

| | | | | |
|---|---|---|---|---|
| 4,364,343 A | * | 12/1982 | Malik | 123/179.4 |
| 6,098,585 A | * | 8/2000 | Brehob et al. | 123/179.5 |
| 7,028,656 B2 | * | 4/2006 | Tsuji et al. | 123/179.16 |
| 7,066,128 B2 | * | 6/2006 | Satake et al. | 701/113 |
| 2004/0149251 A1 | | 8/2004 | Nishikawa et al. | 123/198 |

FOREIGN PATENT DOCUMENTS

| | | |
|---|---|---|
| JP | 1-170735 | 7/1989 |
| JP | 11-107823 | 4/1999 |
| JP | 2004-360549 A * | 12/2004 |

* cited by examiner

*Primary Examiner*—Hieu T. Vo
(74) *Attorney, Agent, or Firm*—Nixon & Vanderhye P.C.

(57) ABSTRACT

An engine stopping and starting control device predicts which cylinder will be on a compression stroke upon being stopped during a process for stopping the engine. Fuel is injected into the predicted cylinder during the process for stopping the engine to seal an air-fuel mixture therein. The same cylinder is then fired upon the next start cycle to generate a first explosion to start the engine.

12 Claims, 10 Drawing Sheets

ENGINE STARTING AND STOPPING CONTROL DEVICE

CROSS REFERENCE TO RELATED APPLICATIONS

This application is based upon and claims the benefit of priority of Japanese Patent Application No. 2004-114439, filed on Apr. 8, 2004, the contents of which are incorporated herein by reference.

FIELD OF THE INVENTION

The present invention relates to an engine starting and stopping control device having enhanced startability.

BACKGROUND OF THE INVENTION

Generally, a cylinder is determined based on an output signal from a crank angle sensor and a cam angle sensor and a crank angle is detected to perform an ignition control or fuel injection control when the engine is being operated. Therefore, the first firing and injecting cylinder is unclear until the engine is cranked by a starter to complete the determination of the cylinder. Accordingly, upon the start of the engine, the fuel injection is performed to a cylinder that can combust the fuel as fast as possible and ignition is performed to generate a first explosion to start the engine, after the cylinder determination is completed.

However, in this starting method, a cranking period to some degree is required by the completion of the cylinder determination and fuel is injected to the first cylinder performing the intake stroke after the completion of the cylinder determination. Therefore, taking a four-cylinder engine as an example, two to three strokes are required from the start of the cranking to the first explosion, thereby entailing a disadvantage that the starting time increases by that much. When the starting time increases in a vehicle having mounted thereto an idle stop system wherein the engine is automatically stopped (idle stop) when a predetermined automatic stop condition is established during the idling and the engine is automatically restarted by an operation on an accelerator pedal by a driver, in particular, the driver is likely to feel slowness upon the restart or the driving sound of the starter becomes a jarring noise, so that the demand for shortening the starting time is strong.

Japanese patent document JP-1-170735A discloses a method of performing an injection asynchronous with the starter wherein fuel is injected to all cylinders in synchronicity with the starter signal. The fuel is sucked into the cylinder performing the intake stroke at this time and ignition is performed via the compression stroke to generate the first explosion in order to shorten the starting time.

Alternately, Japanese patent document JP-11-107823A discloses a method wherein an engine stopping position is estimated and stored in a memory when the engine is stopped and a cylinder that is to be firstly fuel-injected and fired is estimated based on the stored engine stopping position during the next engine starting operation.

However, both starting methods described above require a process in which fuel is injected and sucked into the cylinder performing the intake stroke after the start of the cranking. Then, ignition is performed during the compression stroke of the cylinder. Therefore, a period of almost two strokes is required from the start of the cranking to the first explosion, with the result that the required starting time cannot be satisfied in the case of restarting after the idle stop.

Additionally, in the injection system asynchronous disclosed in Japanese patent document JP-1-170735A, fuel is injected to all cylinders at the beginning of the starting operation so that the fuel not used for the combustion is emitted intact, thereby entailing a problem of deteriorating the exhaust emission during the starting operation.

SUMMARY OF THE INVENTION

The present invention is accomplished in view of the above-mentioned circumstances, and aims to provide an engine stopping and starting control device that can complete the starting in a short period without deteriorating the exhaust emission.

In order to accomplish the above-mentioned object, one aspect of the invention includes a prediction means for predicting which cylinder is on a compression stroke upon a stop of the engine during the process of stopping an engine, a control means for controlling a fuel injection upon the stop injects fuel into the cylinder predicted by the prediction means to seal an air-fuel mixture therein, and start control means for firing the cylinder that is on the compression stroke upon the stop to generate a first explosion to start the engine when the engine is to be started.

In an intake port injection engine, for example, fuel is injected to the cylinder that is predicted by the prediction means during the intake stroke immediately before the stop, whereby the engine is stopped with the air-fuel mixture sucked into and sealed in the cylinder. Further, in the direct fuel injection engine, fuel is injected to the cylinder, which is predicted by the prediction means during the intake stroke immediately before the stop or at the compression stroke, whereby the engine is stopped with the air-fuel mixture sealed in the cylinder. This defines a state wherein the air-fuel mixture is already sealed in the cylinder that is on the compression stroke of the next starting operation, thereby being capable of generating a first explosion by firing this cylinder on the compression stroke. According to this, the first explosion can be generated in a short period of within one stroke from the start of the cranking, so that the starting can be completed in a short period. Further, different from the injection asynchronous with the starter, fuel is not injected to the cylinder that is not used for the starting operation combustion. Thus, there is no chance to deteriorate the exhaust emission during the starting operation.

Another aspect of the present invention is provided with a stopping position control means for controlling the engine stopping position. The engine stopping is controlled to be positioned at a point after the intake valve of the cylinder that is on the compression stroke upon the stop of the engine is closed and before the passage of a predetermined crank angle for securing a combustion pressure for the first explosion at the next starting operation.

Specifically, since the air-fuel mixture cannot be sealed even in the cylinder on the compression stroke upon the stop until the intake valve is closed, it is necessary to control the engine stopping position to be the point after the intake valve of the cylinder on the compression stroke upon the stop is closed.

Further, when the engine is stopped at the position where compression pressure of the air-fuel mixture in the cylinder on the compression stroke becomes high (at the position where the piston approaches the top dead center) even after the intake valve of the cylinder on the compression stroke upon the stop is closed, the air-fuel mixture is leaked from the gap between the piston and the inner wall of the cylinder in a relatively short period while the engine is being stopped.

This leakage decreases the compression pressure, or reduces the rising amount of the piston to the top dead center during the next starting operation. This causes insufficient compression of the air-fuel mixture in the cylinder on the compression stroke. As a result, the first explosion is failed or one compression starting is failed due to the lack of combustion pressure for the first explosion.

As a countermeasure, the engine stopping position is controlled to be the point before the passage of the predetermined crank angle for securing the combustion pressure for the first explosion at the next starting, i.e., to be the position where the compression pressure of the air-fuel mixture in the cylinder on the compression stroke is low (the position where the rising amount of the piston to the top dead center can be secured at the next starting). This reduces the leakage of the air-fuel mixture in the cylinder on the compression stroke or reduction in the compression pressure upon the engine stop. Further, the air-fuel mixture in the cylinder on the compression stroke can sufficiently be compressed for the next starting operation, thereby surely generating the first explosion having sufficient combustion pressure and, hence, one compression starting can surely be realized.

According to another aspect of the present invention, upon predicting which cylinder is on the compression stroke upon the stop, a motion parameter representing the motion of the engine and a hindering parameter hindering the motion of the engine are calculated during the process for stopping the engine. A future parameter representing the future motion of the engine is predicted based on the above two parameters and the cylinder that is on the compression stroke upon the stop is predicted based on the predicted value of the future parameter. This can precisely predict the future parameter by considering a dispersion due to a manufacturing tolerance of the engine, secular change, and change in the engine friction (for example, difference in viscosity due to oil temperature change of the engine oil), during a process for calculating the motion parameter and the hindering parameter, with the result that the cylinder that is on the compression stroke upon the engine stop can be precisely predicted from the future parameter.

In this case, according to another aspect of the invention, a future instantaneous engine speed is predicted as the future parameter during the process for stopping the engine. Furthermore, the revolution of the engine is predicted to be stopped with the stroke state of each cylinder at this point when this future instantaneous engine speed becomes not more than a predetermined value. In summary, the revolution of the engine is predicted to be stopped at a stage when the predicted future instantaneous engine speed is reduced down to the revolution speed area by which the piston cannot go over the compression TDC (top dead center).

Moreover, in another aspect of the present invention, upon controlling the engine stopping position, the intake air amount is increased when the cylinder that is predicted to be stopped on the compression stroke by the prediction means is in the intake stroke immediately before the engine stop, whereby the compression pressure of the cylinder on the compression stroke upon the stop is increased to stop the revolution of the engine. When the compression pressure in the compression stroke is increased when the revolution of the engine is stopped as described above, the negative rotational torque generating in the compression stroke is increased to act as a force for hindering the revolution of the engine. This results in a brake force that is applied on the revolution of the engine and the crank angle range in which the rotational torque becomes not more than the engine friction (the crank angle range in which the revolution of the engine can be stopped) is narrowed, and hence, the revolution of the engine is stopped within this crank angle range. This makes it possible to control the engine stopping position to be the point after the intake valve of the cylinder on the compression stroke upon the stop is closed and before the predetermined crank angle that can secure the combustion pressure for the first explosion. Moreover, the engine stopping position can be controlled by utilizing means for controlling the intake air amount (e.g., idle speed control valve, electronic throttle valve, variable valve mechanism) so that the present invention can be applied to the existing engine control system only by changing the control program.

The aspects of the invention explained above can be applied to the case where a driver operates an ignition switch to stop and start the engine, but the present invention may be applied to an idle stop system provided with automatic stop means for stopping the fuel injection and ignition to stop the revolution of the engine when a predetermined automatic stop condition is established during the idling, wherein the cylinder on the compression stroke upon the stop is predicted to inject the fuel to thereby seal the air-fuel mixture in the cylinder at the engine stop (idling) by the automatic stop means, and when the predetermined automatic start condition is established, the starting control is started to fire the cylinder on the compression stroke upon the stop, thereby generating the first explosion to restart the engine. This enables to realize one compression starting that cannot be realized by the conventional idle stop system, whereby the demand for shortening the starting time can be satisfied and the feeling of slowness at the restart is not recognized by a driver. Further, the noise due to the driving sound of the starter can be reduced, thereby satisfying the demand for silence.

Other features and advantages of the present invention will be appreciated, as well as methods of operation and the function of the related parts from a study of the following detailed description, appended claims, and drawings, all of which form a part of this application. In the drawings:

DESCRIPTION OF THE PREFERRED EMBODIMENT

Explained hereinafter is one embodiment of the present invention, wherein the best mode for carrying out the present invention is embodied by an intake port injection type four-cylinder engine.

Figure 1:
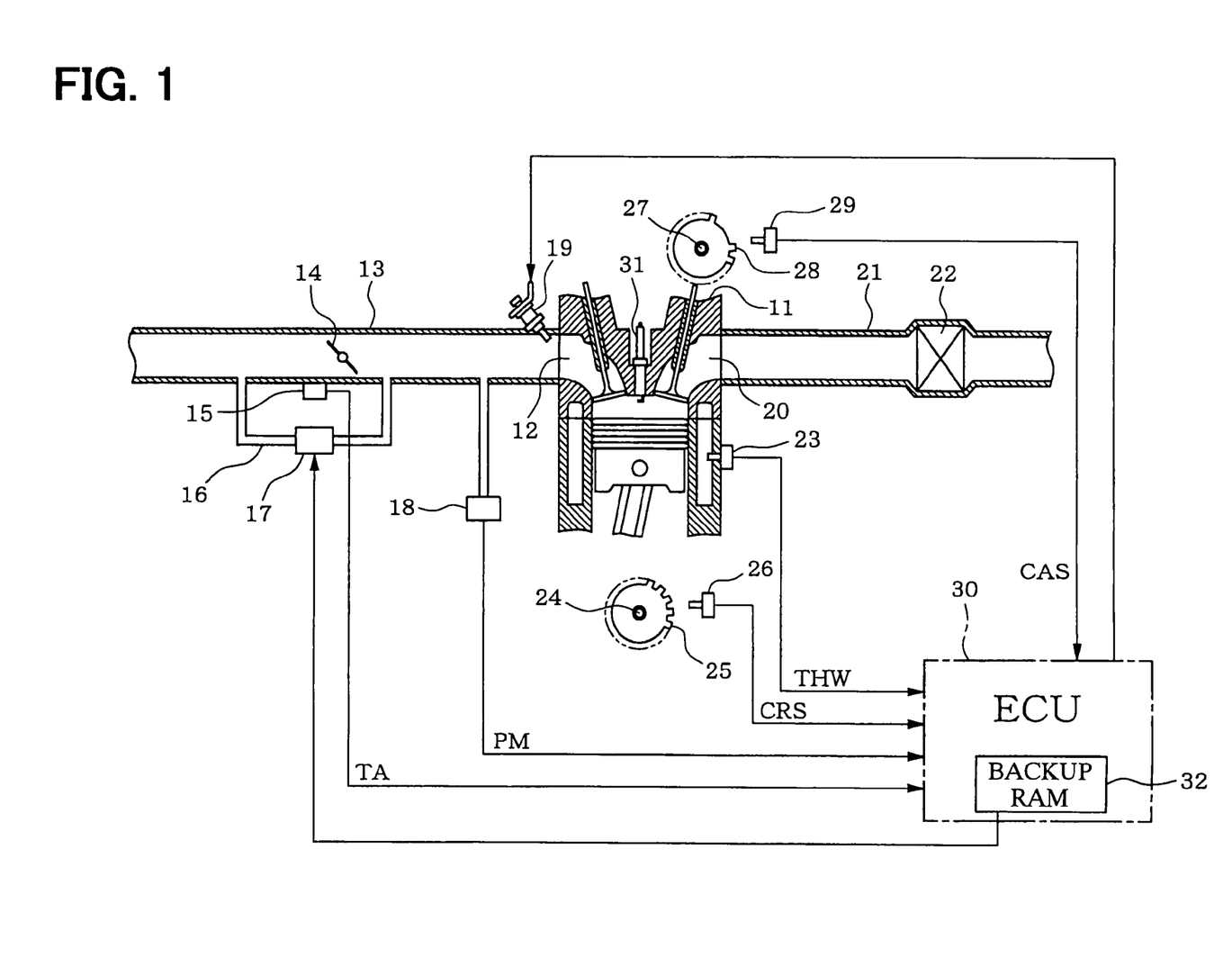
FIG. 1 is a schematic diagram of an engine control system according to one embodiment of the present invention.

Firstly, an entire configuration of an engine control system will be explained with reference to FIG. 1. A throttle valve 14 is mounted to an intake pipe 13 connected to an intake port 12 of an engine 11. An opening of this throttle valve 14 (throttle opening) TA is detected by a throttle opening sensor 15. A bypass path 16 is mounted to the intake pipe 13 for bypassing the throttle valve 14. An idle speed control valve (hereinafter referred to as "ISC valve") 17 is mounted to this bypass path 16. An intake manifold pressure sensor 18 for detecting an intake manifold pressure PM is mounted at the downstream side of the throttle valve 14 and a fuel injection valve 19 is attached in the vicinity of the intake port 12 of each cylinder.

A catalyst 22 for purifying exhaust gas is mounted to an exhaust pipe 21 connected to an exhaust port 20 of the engine 11. A cooling water temperature sensor 23 for detecting a cooling water temperature THW is provided at a cylinder block of the engine 11. A crank angle sensor 26 is provided opposite to the outer periphery of a signal rotor 25 attached to a crankshaft 24 of the engine 11, wherein the crank angle sensor 26 outputs a pulse of a crank signal every predetermined crank angle (for example, every 10° CA) that is synchronized with the rotation of the signal rotor 25. Provided to the signal rotor 25 of the crank angle sensor 26 are a continuously toothless section in which one to several teeth (pulses) are missing and a one-tooth missing section (see FIG. 8), whereby a crank angle reference position is detected by these continuously toothless section and one-tooth missing sections. Moreover, a cam angle sensor 29 is disposed opposite to the outer periphery of a signal rotor 28 attached to a cam shaft 27 of the engine 11, wherein the cam angle sensor 29 outputs a pulse of a cam signal with a predetermined cam angle that is synchronized with the rotation of the signal rotor 28.

Outputs from the various sensors are inputted to an engine control circuit (hereinafter referred to as "ECU") 30. This ECU 30 is composed mainly of a microcomputer for controlling a fuel injection quantity or injection timing of the fuel injection valve 19, an ignition timing of an ignition plug 31, and a bypass air flow rate of the ISC valve 17 or the like according to the engine operation state detected by various sensors. Further, when a predetermined automatic stop condition is established to turn an idle stop signal ON during the idling, the ECU 30 serves as automatic stop means for stopping the fuel injection and ignition to thereby stop the engine revolution. When a predetermined automatic start condition is established by an operation of an accelerator pedal by a driver when the engine is being stopped by the idling stop, it serves as a starting control means that starts a starting control for one compression starting, which is described later, and fires a cylinder on a compression stroke with the first compression TDC after the start of the cranking to cause a first explosion to make a restart.

Further, this ECU 30 executes each routine shown in FIGS. 9 to 11 and described later to perform a crank angle determination, cylinder determination, calculation and storage of engine speed, calculation and storage of kinetic energy, calculation and storage of workload hindering the engine motion, calculation of predicted value of future kinetic energy, calculation of predicted value of future instantaneous engine speed, prediction of engine stopping position (stroke state of each cylinder when the engine stops) and stopping position control by the ISC valve 17 based on the crank signal and the cam signal. The information of the engine stopping position is stored in a backup RAM 32 (rewritable non-volatile memory) or RAM, and a starting control for one compression starting, which is described later, is executed by using the stored information of the engine stopping position.

Figure 2:
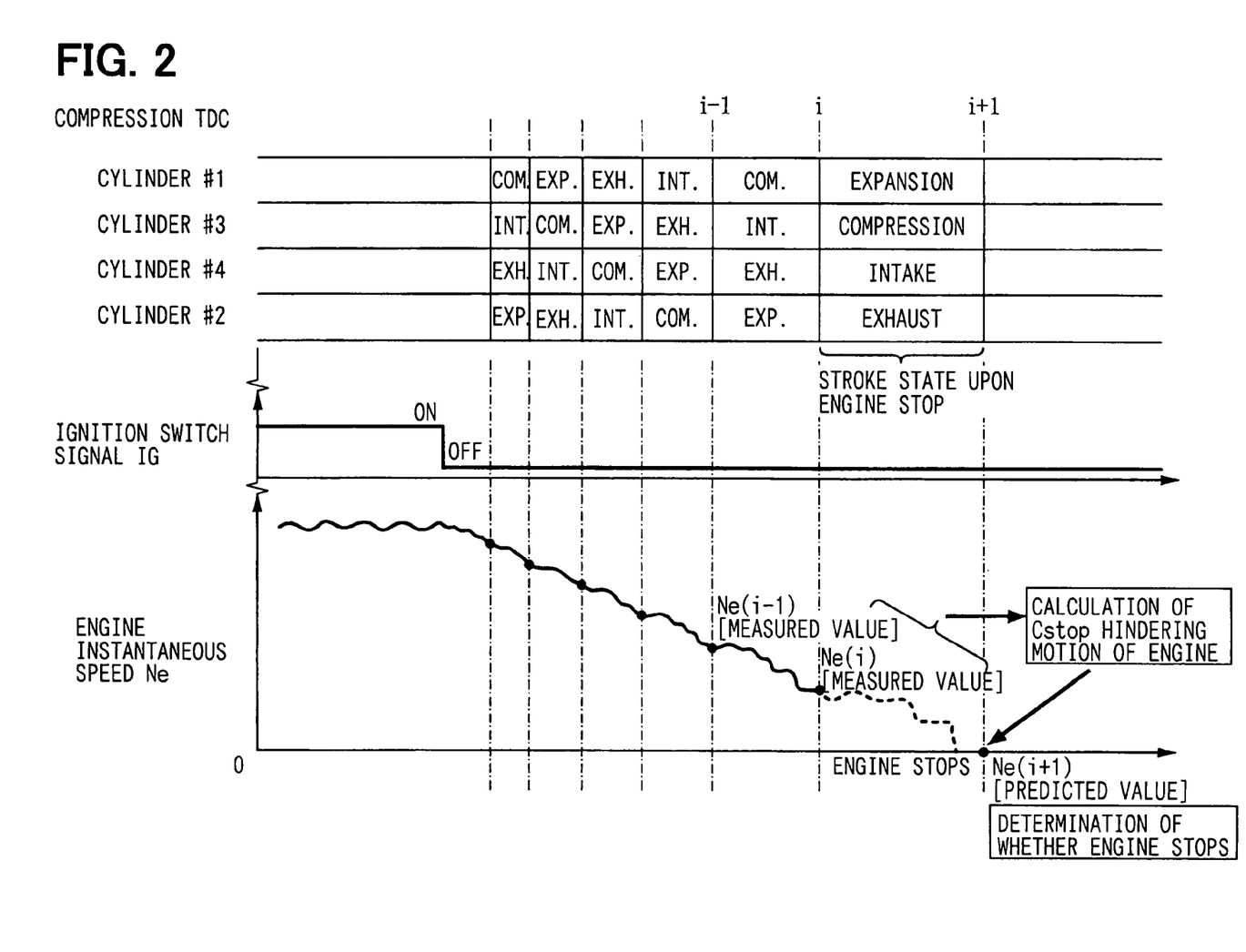
FIG. 2 is a timing chart of one method for predicting an engine stopping position according to the present invention.

An estimating method of the engine stopping position will be explained by using a time chart of an engine stopping process shown in FIG. 2. In this embodiment, the instantaneous engine speed (hereinafter referred to "instantaneous speed") at each compression TDC is used as a parameter representing the motion of the engine. The ECU 30 counts a time required for the crankshaft 24 to rotate at, for example, 10° CA from the pulse interval of the crank signal, thereby calculating the instantaneous speed Ne.

Considered here is the energy balance at the ith compression TDC (hereinafter simply referred to as "TDC(i)") in FIG. 2. This embodiment considers a pumping loss, friction loss at each section, and driving loss of each accessory as work that hinders the motion of the engine. Supposing that the kinetic energy possessed by the engine is $E(i-1)$ at TDC(i-1). This kinetic energy $E(i-1)$ is derived by the work due to the above-mentioned each loss before reaching the next TDC(i) to thereby fall off to $E(i)$. This energy balance is expressed by the following equation (1).

$$E(i)=E(i-1)-W \tag{1}$$

In this equation, W is a value obtained by adding all workloads derived by each loss during the period from TDC(i-1) to TDC(i).

Further, it can be expressed by the following equation (2), regarding the motion of the engine as the rotary motion.

$$E=J\times 2\pi^2 \times Ne^2 \tag{2}$$

In this equation, E is kinetic energy possessed by the engine, J is inertia moment determined for every engine and Ne is an instantaneous speed.

By using this equation (2), the relation of the energy balance expressed by the equation (1) can be replaced into the relation of the change in the instantaneous speed expressed by the following equation (3).

$$Ne(i)^2 = Ne(i-1)^2 - \frac{W}{J\times 2\pi^2} \tag{3}$$

The second term at the right side of the equation (3) is defined as a hindering parameter Cstop hindering the motion of the engine and is defined by the following equation (4).

$$Cstop = \frac{W}{J\times 2\pi^2} \tag{4}$$

The hindering parameter Cstop hindering the motion of the engine is calculated by using the following equation (5) derived from the aforesaid equations (3) and (4).

$$Cstop=Ne(i-1)^2-Ne(i)^2 \tag{5}$$

Figure 4:
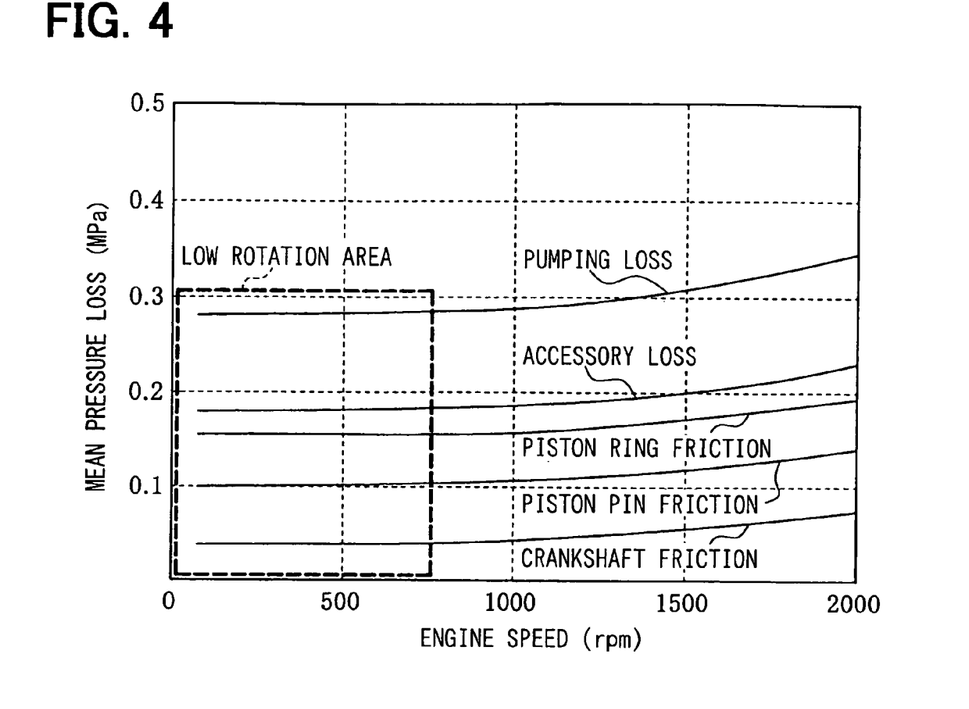
FIG. 4 is a graph illustrating a relationship between an engine speed of a gasoline engine and a magnitude of losses according to the present invention.

Further, the hindering parameter Cstop hindering the motion of the engine is determined by the workload W hindering the motion by each loss between TDCs and the inertia moment J as defined by the equation (4). Under the motion condition of low rotation such as a process for stopping the engine, the pumping loss, friction loss at each section, and driving loss of each accessory is considered work that hinders the motion and takes generally a constant value regardless of the engine speed Ne, as shown in FIG. 4. Accordingly, the workload W hindering the motion of the engine takes generally a constant value at any intervals of TDC during the engine stopping process. Additionally, the inertia moment J is a specific value for each engine, so that the hindering parameter Cstop hindering the motion of the engine takes generally a constant value during the process for stopping the engine.

Accordingly, the predicted value of the instantaneous speed Ne(i+1) at the next future TDC(i+1) can be calculated from the following equations (6a) or (6b) by using the current instantaneous speed Ne(i) actually measured and the hindering parameter Cstop that hinders the motion of the engine between TDCs and is calculated by using the equation (5).

$$\text{When } Ne(i)^2 \geq C\text{stop}, Ne(i+1) = \sqrt{Ne(i)^2 - C\text{stop}} \quad (6a)$$

$$\text{When } Ne(i)^2 < C\text{stop}, Ne(i+1) = 0 \quad (6b)$$

The case of $Ne(i)^2 < C\text{stop}$ means that the workload W hindering the motion between TDCs becomes greater than the kinetic energy E(i) currently possessed by the engine. Therefore, in order to avoid that the calculation result become an imaginary number, Ne(i+1) equals 0.

In case where the stroke state of each cylinder (a cylinder on the compression stroke upon the stop) at the engine stopping position is predicted by using the predicted value of the instantaneous speed Ne(i+1) at the next future TDC(i+1) calculated as described above, there is a method wherein whether the revolution of the engine is stopped or not is judged by comparing the predicted value of the instantaneous speed Ne(i+1) at the next future TDC(i+1) with a preset stop determination value Nth for estimating the stroke state of each cylinder (a cylinder on the compression stroke upon the stop) at the engine stopping position.

In this estimating method, whether the revolution of the engine is stopped or not is judged from the predicted value of the instantaneous speed at the next future TDC, so that the engine stopping position can only be estimated just before the revolution of the engine is stopped.

In view of this, a process for predicting more future instantaneous speed is repeated until the revolution of the engine is judged to be stopped by using the predicted value of the future instantaneous speed and the parameter hindering the motion in a cylinder state prediction routine when the engine stops described later shown in FIG. 10, whereby the engine stopping position can be estimated at any point that is not just before the revolution of the engine is stopped.

Figure 3:
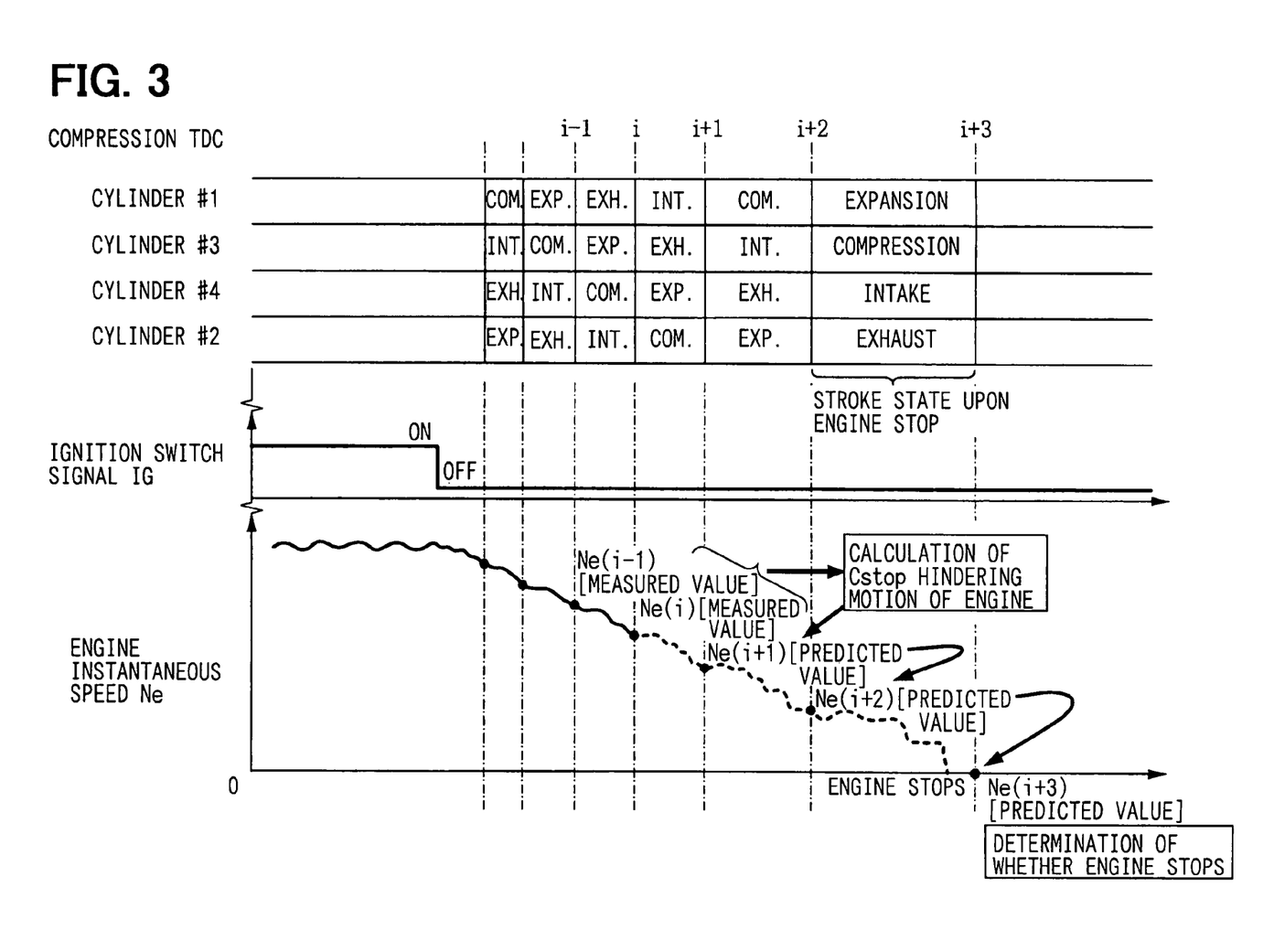
FIG. 3 is a timing chart of a second method for predicting an engine stopping position according to the present invention.

The estimating method of the engine stopping position will be explained hereinafter with reference to a time chart shown in FIG. 3. The parameter Cstop hindering the motion of the engine and the instantaneous speed Ne(i+1) at the next future TDC(i+1) are calculated at a certain TDC(i) during the process for stopping the engine by the same manner in the above-mentioned estimating method.

As described above, the hindering parameter Cstop hindering the motion of the engine takes generally a constant value during the process for stopping the engine, whereby the predicted value of the instantaneous speed Ne(i+2) at the TDC(i+2) that is the second future TDC from the current one is calculated from the following equations (7a) and (7b) by using the calculated Cstop and Ne(i+1).

$$\text{When } Ne(i+1)^2 \geq C\text{stop}, Ne(i+2) = \sqrt{Ne(i+1)^2 - C\text{stop}} \quad (7a)$$

$$\text{When } Ne(i+1)^2 < C\text{stop}, Ne(i+2) = 0 \quad (7b)$$

In this way, the process for calculating the predicted value of the instantaneous speed at the future TDC is repeatedly executed until the predicted value of the instantaneous speed becomes less than the stop determination value, and it is estimated that the revolution of the engine stops before the TDC at which the predicted value of the instantaneous speed becomes less than the stop determination value.

Subsequently, the outline of the control for stopping the revolution of the engine will be explained by using a time chart shown in FIG. 5.

Figure 5:
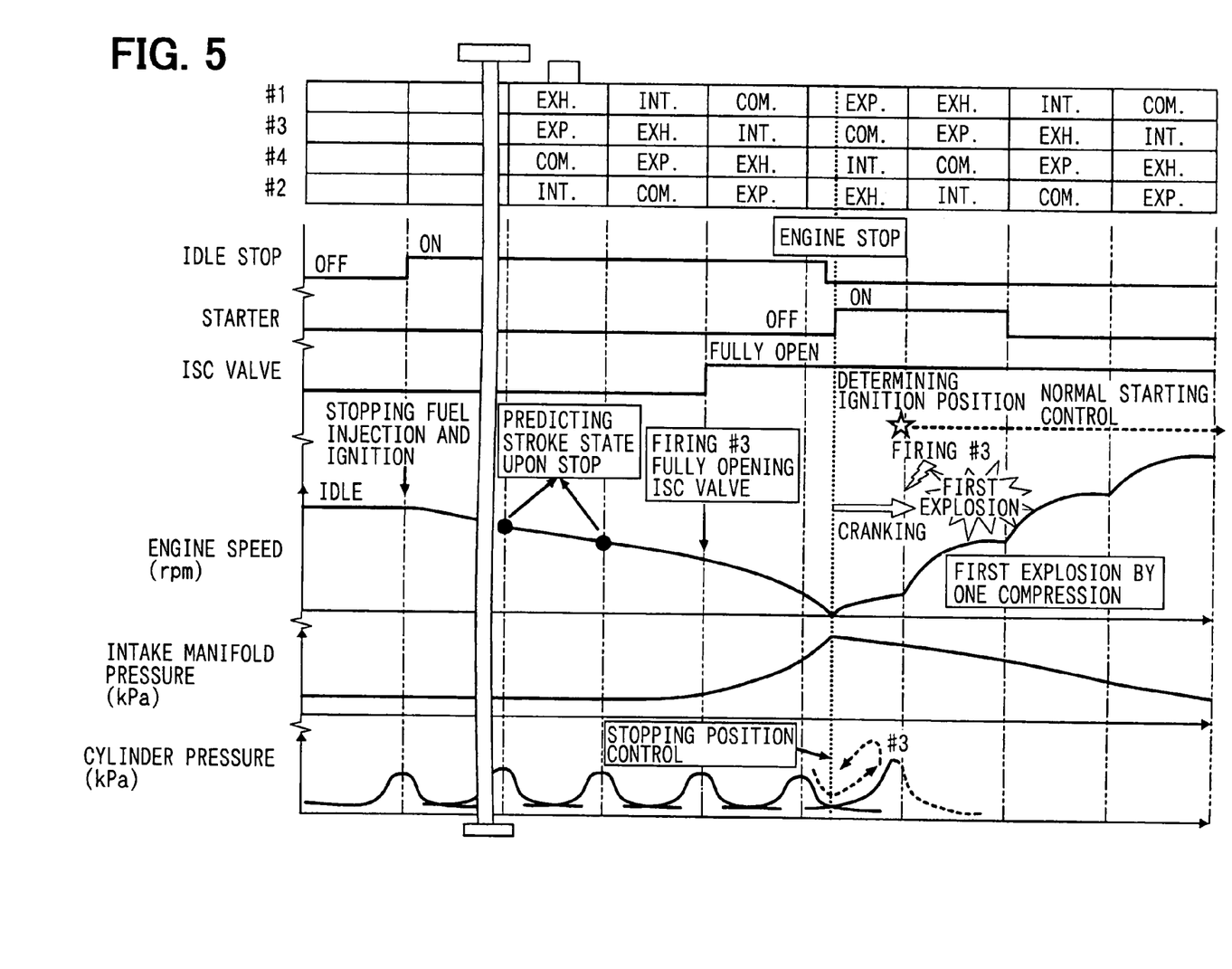
FIG. 5 is a timing chart for predicting the engine stopping position and a control method of one compression starting of the present invention.

As shown in FIG. 5, in a case where the idle stop signal is turned ON to stop both the fuel injection and ignition during the idling, the engine 11 keeps on rotating for a short while due to the inertia energy, but the revolution of the engine is decreased due to each loss (pumping loss, friction loss, driving loss of each accessory or the like). During the process for stopping the engine, the stroke state of each cylinder when the engine is stopped is predicted, and the ISC valve 17 is fully opened to increase the intake air amount when the cylinder that is predicted to be stopped with the compression stroke is in the intake stroke immediately before the engine stops (preferably when the intake stroke is started or the period close to that), thereby increasing the compression pressure of the cylinder on the compression stroke upon the stop to increase force hindering the revolution of the engine and, consequently, the revolution of the engine is forcibly stopped. According to this, the engine stopping position is controlled to be the point after the intake valve of the cylinder that is on the compression stroke upon the stop is closed and before the predetermined crank angle that can secure combustion pressure for the first explosion at the next starting. In this case "the predetermined crank angle that can secure combustion pressure for the first explosion at the next starting" means the position where the compression pressure of the air-fuel mixture in the cylinder on the compression stroke is low (the position that can secure the rising amount of the piston to the top dead center upon the next starting).

Figure 6:
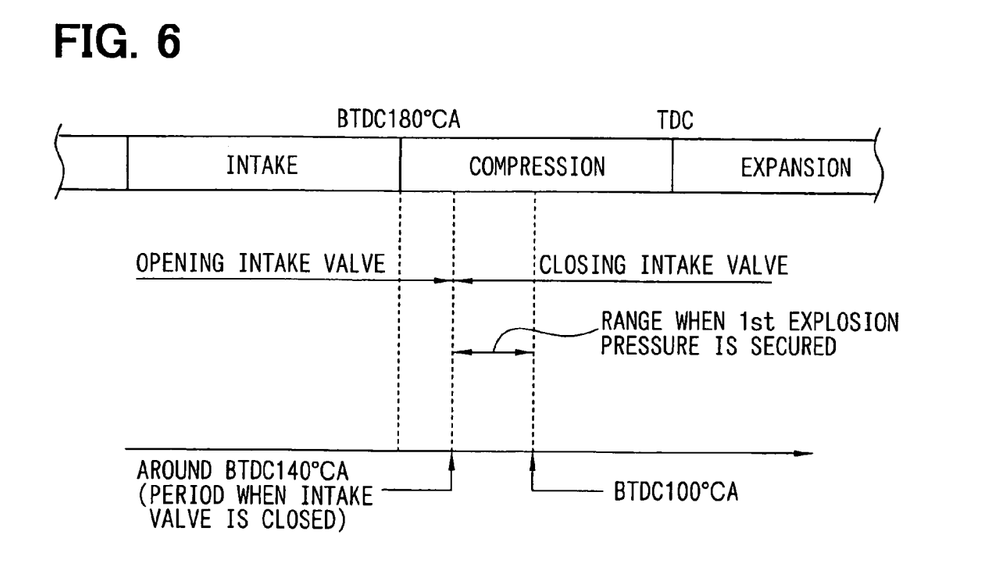
FIG. 6 is a chart illustrating a control method of the engine stopping position according to the present invention.
Figure 7:
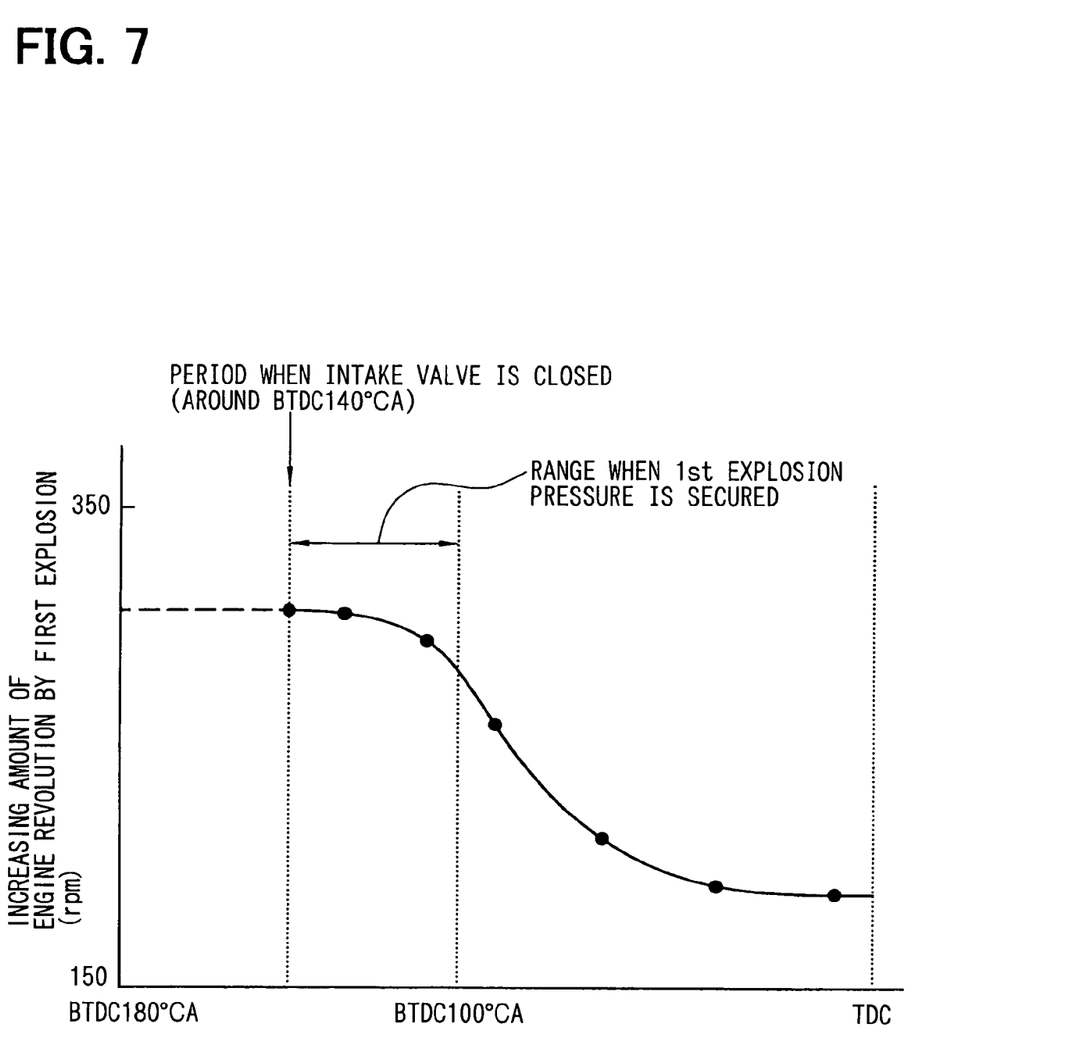
FIG. 7 is a graph illustrating a relationship between an increasing amount of revolutions of the engine by a first explosion and the engine stopping position according to the present invention.

Explained here with reference to FIG. 6 and FIG. 7 is the reason why the engine stopping position is controlled to be the point after the intake valve of the cylinder that is on the compression stroke upon the stop is closed and before the predetermined crank angle that can secure combustion pressure for the first explosion at the next starting. The point where the intake valve is closed in the compression stroke is generally in the neighborhood of 140° CA of BTDC. Accordingly, the intake valve is opened in the period from BTDC 180° CA to BTDC140° CA at the beginning of the compression stroke, so that the air-fuel mixture cannot be sealed in the cylinder on the compression stroke during this period. Therefore, the engine stopping position is required to be the point after the intake valve of the cylinder on the compression stroke upon the stop is closed.

In an engine having mounted thereto a variable valve mechanism (variable valve timing mechanism, variable valve lift mechanism), the closing point of the intake valve is changed according to the variable valve control. Therefore, the engine stopping position may be controlled with the closing point of the intake valve, or the engine stopping position may be controlled to be the point after the slowest point within the variable range of the closing point of the intake valve upon the stop.

Moreover, when the engine is stopped at the position where the compression pressure of the air-fuel mixture in the cylinder on the compression stroke becomes high (the position where the piston is close to the TDC) even after the closing point of the intake valve of the cylinder on the compression stroke upon the stop, the air-fuel mixture is leaked from the gap between the piston and the inner wall of the cylinder in a relatively short period when the engine is being stopped. This leakage decreases the compression pressure, or reduces the rising amount of the piston to the TDC at the next starting, so that the air-fuel mixture in the cylinder on the compression stroke cannot satisfactorily be compressed. As a result, the first explosion is failed or one compression starting is failed due to the lack of combustion pressure for the first explosion.

FIG. 7 is a graph in which the relationship between the increasing amount of the revolution of the engine by the first explosion and the engine stopping position. This example shows that the increasing amount of the revolution of the engine by the first explosion is sufficiently great before the point where the engine stopping position is at BTDC 100° CA, so that one compression starting is possible, while the increasing amount of the revolution of the engine by the first explosion is rapidly decreased after BTDC 100° CA, failing to do one compression starting. Accordingly, it is necessary to control the engine stopping position to be before the predetermined crank angle (before BTDC 100° CA in this embodiment) that can secure the combustion pressure for the first explosion at the next starting. By this control, the engine stopping position can be controlled to be the position where the compression pressure of the air-fuel mixture in the cylinder on the compression stroke is low (the position where the rising amount of the piston to the top dead center can be secured at the next starting). In order to execute the ignition for one compression starting, the ignition reference position is required to be detected before BTDC 90° CA. This condition for detecting the ignition reference position (before BTDC 90° CA) can be satisfied by controlling the engine stopping position to be before the predetermined crank angle that can secure the combustion pressure for the first explosion at the next starting.

After the cylinder that is to be on the compression stroke upon the stop is predicted during the process for stopping the engine, fuel necessary for the first explosion at the next starting is injected to the cylinder, which is predicted to be on the compression stroke upon the stop, during the intake stroke immediately before the stop (preferably when the intake stroke is started or the period close to that), and the ISC valve 17 is fully opened to increase the intake air flow amount. With this arrangement, the compression pressure in the cylinder on the compression stroke upon the stop is increased and the engine is stopped with the air-fuel mixture sealed in the cylinder on the compression stroke upon the stop.

Figure 8:
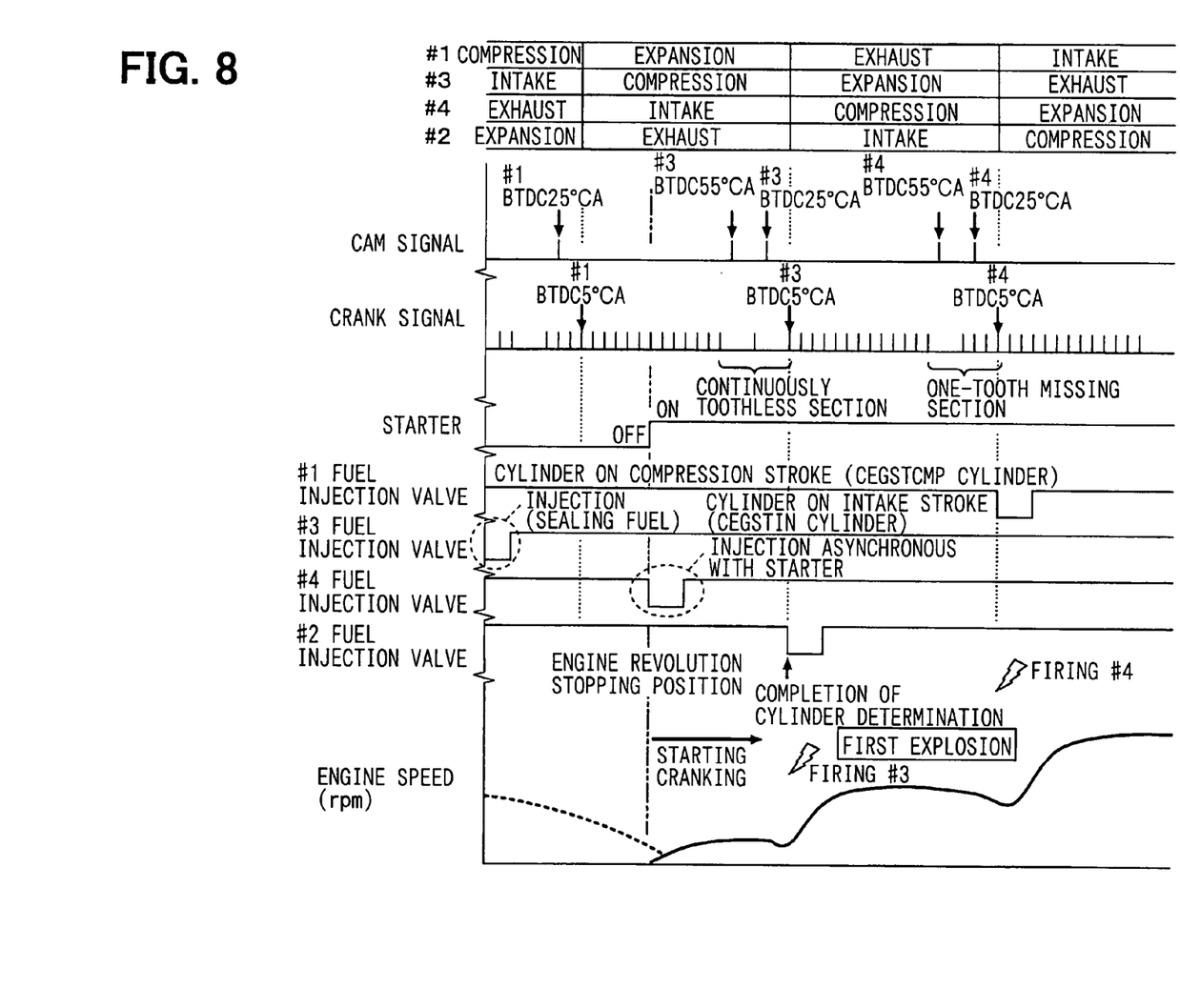
FIG. 8 is a timing chart of a control example of one compression starting according to the present invention.

Subsequently, a starting control for one compression starting will be explained by using a time chart shown in FIG. 8. In this example, the firing order is #1 cylinder→#3 cylinder→#4 cylinder→#2 cylinder, wherein the cylinder is determined and the TDC is judged based on the relationship between the continuously toothless section and one-tooth missing section of the crank signal and the pulse of the cam signal. In the example shown in FIG. 8, the cylinder on the compression stroke upon the idle stop is #3 cylinder, and the engine is stopped with the air-fuel mixture (fuel) sealed in this #3 cylinder.

When a predetermined automatic start condition by an operation on an accelerator pedal by a driver is established when the engine is being stopped by this idle stop, the starter signal is turned ON to start the cranking. Then, for example, BTDC 5° CA (continuously teeth-missing section of the crank signal) of the #3 cylinder that is on the compression stroke upon the idle stop is detected to complete the cylinder determination. At the point when the compression TDC is detected, the #3 cylinder on the compression stroke is fired to generate the first explosion, executing one compression starting. In this case, fuel is injected to the #4 cylinder that is fired next to the first-fired #3 cylinder by an injection asynchronous with the starter at the start of the cranking, whereby the ignition is performed in the order of #3 cylinder and #4 cylinder to cause continuous explosion. After the cylinder determination is completed, synchronous injection is executed that injects fuel is synchronized with the intake stroke of each cylinder.

Figure 9:
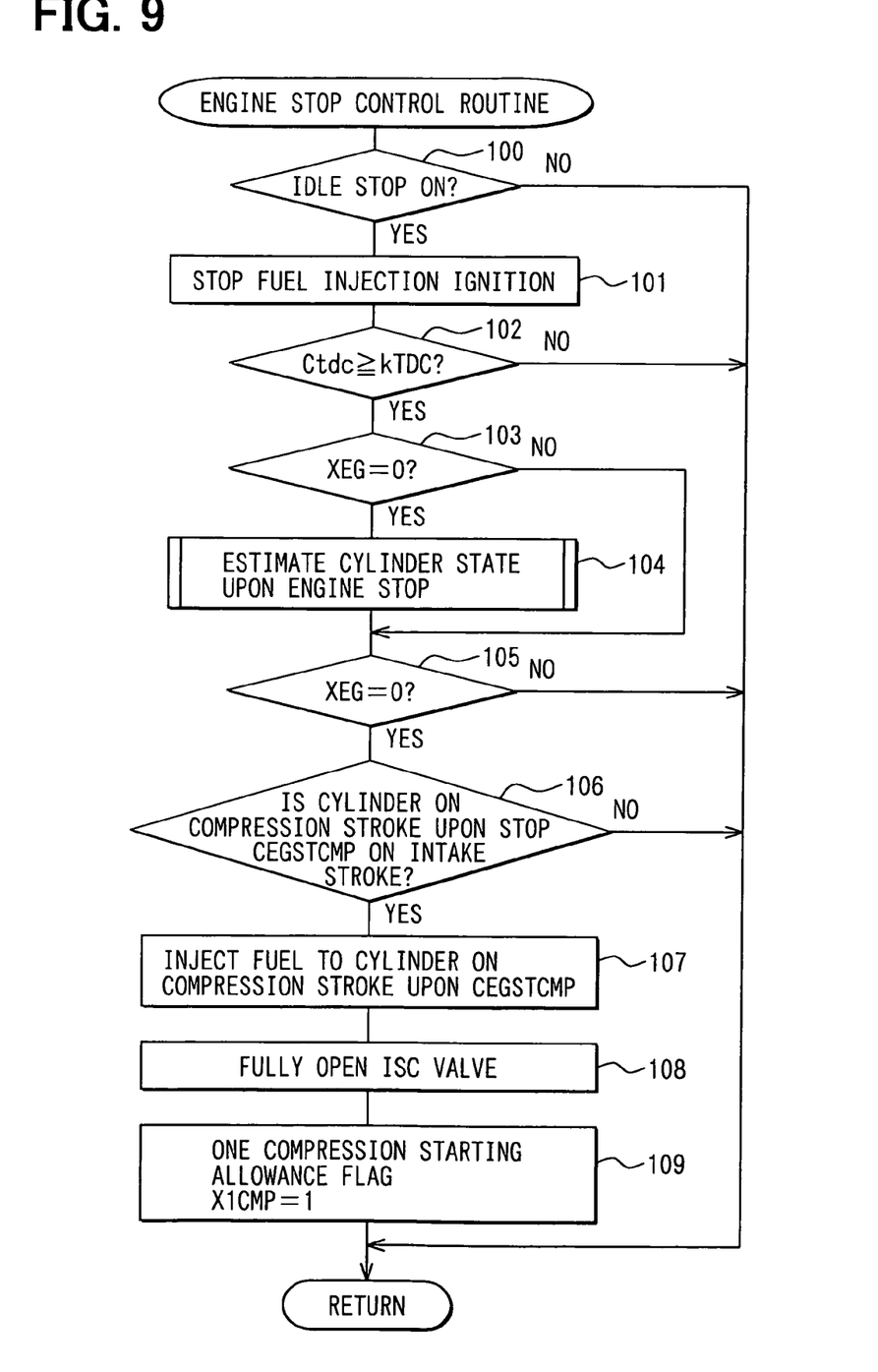
FIG. 9 is a flowchart of an engine stop control routine according to the present invention.
Figure 10:
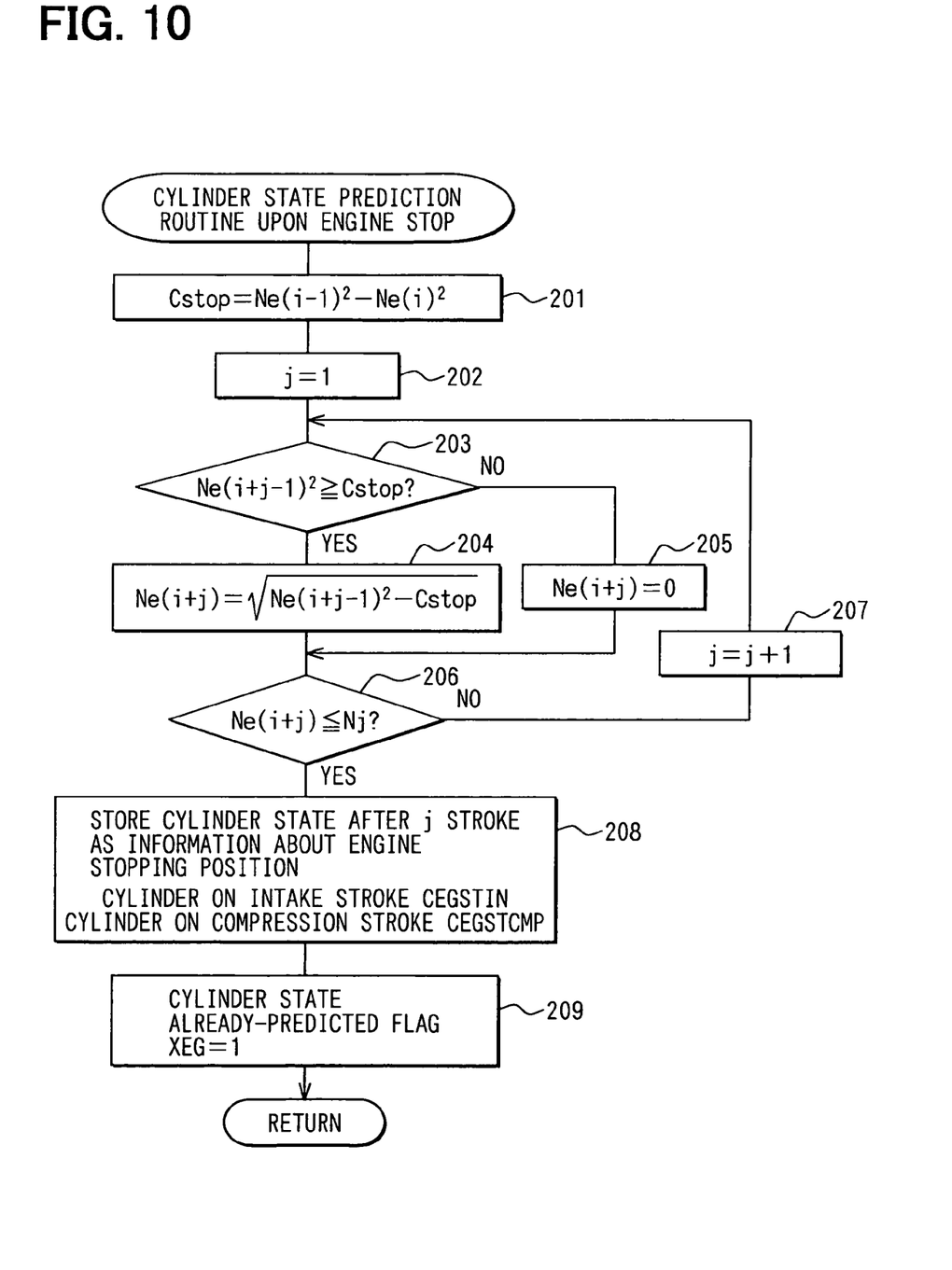
FIG. 10 is a flowchart of a cylinder state prediction routine according to the present invention.
Figure 11:
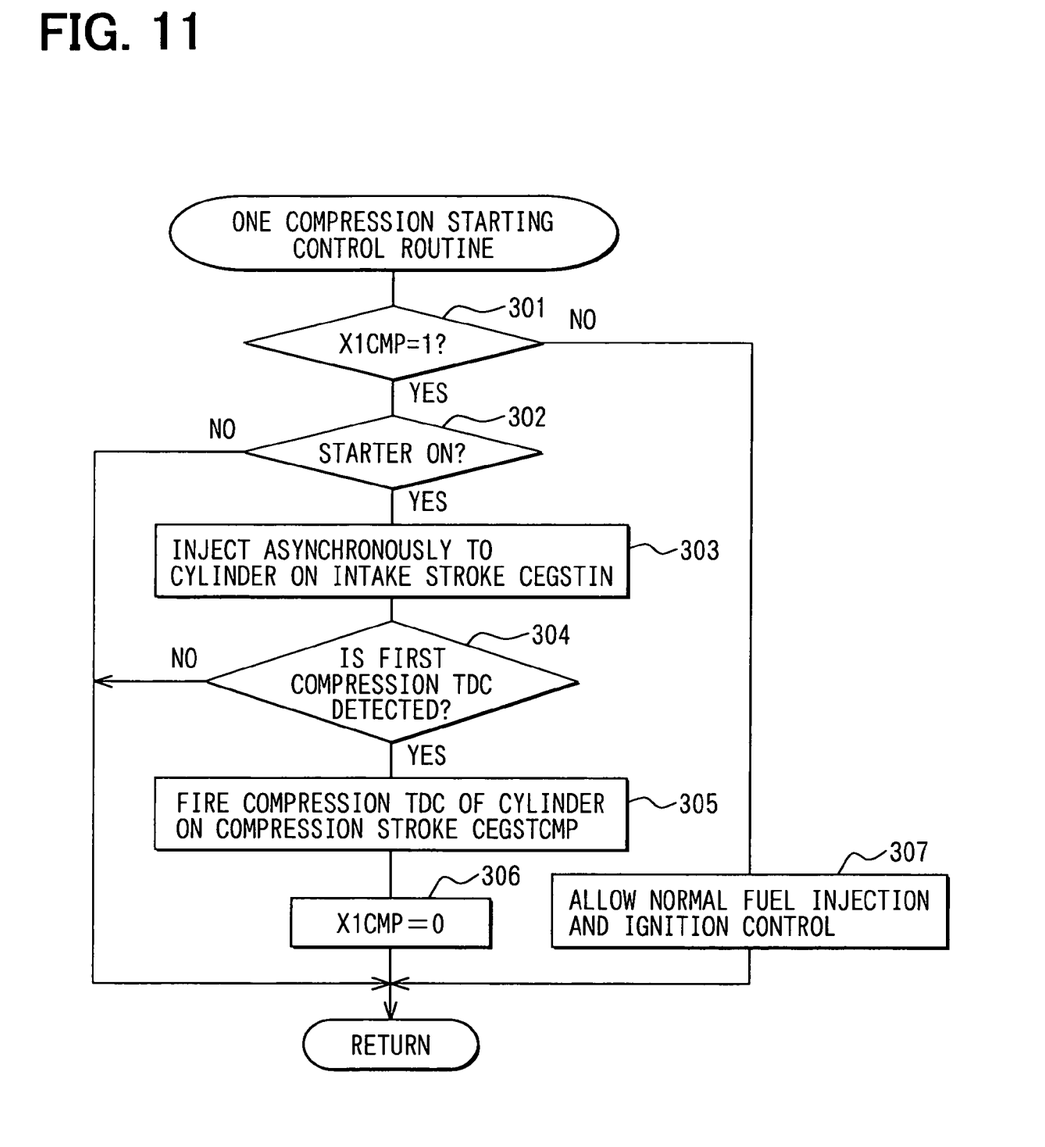
FIG. 11 is a flowchart of a one compression starting control routine according to the present invention.

The control for one compression starting when the engine is stopped and when the engine is started, as explained above, is executed according to each routine shown in FIGS. 9 to 11 by the ECU 30. The processing of each routine will be hereinafter explained.

[Engine Stop Control Routine]

The engine stop control routine in FIG. 9 is executed every TDC, for example. When this routine is activated, it is firstly determined whether the idle stop signal is turned ON or not at Step 100. When the idle stop signal is OFF, this routine is ended without performing the following processes.

On the other hand, when the idle stop signal is ON, the program proceeds to Step 101 to stop the fuel injection and ignition for automatically stopping the engine. The processes at Step 100 and Step 101 serve as automatic stop means in the claims. Thereafter, the program proceeds to Step 102 to determine whether the count value of the TDC counter Ctdc that counts the number of times of the TDC during the process for stopping the engine is not less than a predetermined value k TDC (for example, 1 or 2). When the count value of the TDC counter Ctdc is less than the predetermined value k TDC, this routine is ended without performing the following processes. This is because the engine speed Ne is high just before the fuel injection and ignition are stopped, so that it is difficult to calculate the parameter Cstop hindering the motion of the engine with a stable state and, hence, it is difficult to precisely predict the engine stopping position.

Thereafter, at the point when the count value of the TDC counter Ctdc becomes not less than the predetermined value k TDC, the program proceeds to Step 103 to determine whether a cylinder state already-predicted flag XEG described later is "0" or not that means the cylinder state upon the engine stop has not yet been predicted. WHEN "YES" determination is made (i.e., in the case of the cylinder state already-predicted flag XEG=0), the program proceeds to Step 104 to execute a cylinder state prediction routine upon the engine stop shown in FIG. 10 and described later, whereby the cylinder state (the cylinder on the intake stroke CEGSTIN and the cylinder on the compression stroke CESTCMP) upon the engine stop are predicted, and then, the program proceeds to Step 105. When "NO" determination is made at Step 103 (in the case of the cylinder state already-predicted flag XEG=1), the cylinder state upon the engine stop has already been predicted, so that the program proceeds to Step 105, skipping S104.

At Step 105, it is determined whether the cylinder state already-predicted flag XEG is 1 (the cylinder state upon the engine stop has already been predicted) or not. When "NO" determination is made, this routine is ended without performing the following processes.

On the other hand, when the cylinder state already-predicted flag XEG is determined to be 1, it is determined that the cylinder state upon the engine stop has already been predicted and, then, the program proceeds to Step 106 where it is determined whether the current stroke of the cylinder, which is predicted to be the cylinder on the compression stroke CEGSTCMP upon the engine stop, is the intake stroke immediately before the stop or not. When it is not the intake stroke immediately before the stop, this routine is ended without performing the following processes. When it is the intake stroke immediately before the stop, the program proceeds to Step 107 where fuel necessary for the first explosion at the next starting is injected to the cylinder that is predicted to be the cylinder on the compression stroke CEGSTCMP upon the engine stop during the intake stroke immediately before the stop (preferably when the intake stroke is started or the period close to that), and the ISC valve 17 is fully opened to increase the intake air amount at the next Step 108. This increases the compression pressure of the cylinder on the compression stroke CEGSTCMP upon the stop to increase force hindering the revolution of the engine, and consequently, the revolution of the engine is forcibly stopped. Thereafter, the program proceeds to Step 109 to set one compression starting allowance flag X1CMP to "1" that allows one compression starting, and then, this routine is ended.

It should be noted that the processes at Step 106 and Step 107 serve as means for controlling the fuel injection upon the stop in the claims, and the process at Step 108 serves as stopping position control means in the claims.

[Cylinder State Prediction Routine Upon the Engine Stop]

The cylinder state prediction routine upon the engine stop in FIG. 10 is a subroutine executed at Step 104 of the engine stop control routine in FIG. 9, and serves as means for predicting a cylinder on the compression stroke upon the stop in the claims. When this routine is activated, the parameter Cstop hindering the motion of the engine is firstly calculated from the equation (5) by using the instantaneous speed Ne(i−1) at the last-time TDC(i−1) and the instantaneous speed Ne(i) at the current TDC(i).

Thereafter, the program proceeds to Step 202 to set an initial value "1" to a prediction number counter j that counts the prediction number of the instantaneous speed. Then, at Steps 203, 204 and 205, the predicted value of the instantaneous speed Ne (i+j) at the future TDC(i+j) after the j stroke (j=1 at the beginning) is calculated as follows. Firstly, it is determined whether $Ne(i+j-1)^2 \geq Cstop$ or not at Step 203. When "YES" determination is made, the program proceeds to Step 204 to calculate the predicted value of the instantaneous speed Ne (i+j) at the future TDC(i+j) after the j stroke by using the equation (6a).

On the other hand, in the case of $Ne(i+j-1)^2 < Cstop$, the program proceeds to Step 205 to set the predicted value of the instantaneous speed Ne (i+j) at the future TDC(i+j) after the j stroke to 0.

Then, at the next Step 206, it is determined whether the revolution of the engine is stopped by not being able to go over the future TDC(i+j) after the j stroke by determining whether the predicted value of the instantaneous speed Ne (i+j) at the future TDC(i+j) after the j stroke is not more than a preset stop determination value Nj. When it is determined that the predicted value of the instantaneous speed Ne (i+j) at the future TDC(i+j) after the j stroke is more than the stop determination value Nj as a result of this (it is determined that the engine keeps on rotating over the future TDC(i+j) after the j stroke), the program proceeds to Step 207 to increase the prediction number counter j by 1 and, then, the program returns to the processes at Steps 203 to 205 to repeatedly perform the above-mentioned process.

As described above, the calculation of the predicted value of the future instantaneous speed Ne (i+j) is repeated until this value becomes less than the stop determination value Nj, whereby the future instantaneous speed Ne(i+j) is successively predicted at an interval of TDC.

When the predicted value of the future instantaneous speed Ne (i+j) becomes less than the stop determination value Nj, it is determined that the engine is stopped before the TDC(i+j) of the instantaneous speed Ne(i+j). Then, the program proceeds to Step 208 to store in the backup RAM 32 or RAM the stroke state of each cylinder (the cylinder on the intake stroke CEGSTIN and the cylinder on the compression stroke CESTCMP) during from the future TDC(i+j) after the j stroke at which the engine is determined to be stopped to the TDC(i+j−1) that is immediately before the future TDC(i+j) as the information about the engine stopping position.

For example, when the predicted value of the instantaneous speed Ne (i+3) at the future TDC(i+3) after three strokes is determined to be less than the stop determination value Nj, it is determined that the revolution of the engine is stopped from the future TDC(i+2) after two strokes to the future TDC(i+3) after three strokes, and the stroke state of each cylinder (the cylinder on the intake stroke CEGSTIN and the cylinder on the compression stroke CESTCMP) during from TDC(i+2) to TDC(i+3) is stored in the backup RAM 32 or RAM as the information about the engine stopping position. Thereafter, the program proceeds to Step 209 to set the cylinder state already-predicted flag XEG to "1," ending this routine.

[One Compression Starting Control Routine]

The one compression starting control routine in FIG. 11 is repeatedly activated every predetermined period (e.g., 8 ms) during when the power of the ECU 30 is turned ON, and serves as start control means in the claims. When this routine is activated, it is determined at Step 301 whether the one compression starting allowance flag X1CMP is "1" that means one compression starting is allowed. When "NO" determination is made, the program proceeds to Step 307 to allow the normal fuel injection and ignition and inhibit one compression starting.

On the other hand, when the one compression starting allowance flag X1CMP is 1 (one compression starting is allowed), the program proceeds to Step 302 to determine whether the starter signal is turned ON (cranking is started) or not. When the starter signal is OFF, this routine is ended without performing the following processes. When the starter signal is ON (the cranking is started), the program proceeds to Step 303 where the cylinder on the intake stroke upon the start of the cranking CEGSTIN is determined from the information about the engine stopping position stored in the backup RAM 32 or RAM and fuel is asynchronously injected to the cylinder on the intake stroke CEGSTIN.

Then, the program proceeds to Step 304 to determine whether the first compression TDC is detected or not after the start of the cranking. When the compression TDC has not yet been detected, this routine is ended without performing the following processes. Then, at the point when the first compression TDC is detected, the program proceeds to Step 305 where the cylinder on the compression stroke upon the start of the cranking CESTCMP is determined from the information about the engine stopping position stored in the backup RAM 32 and the ignition is performed to the cylinder on the compression stroke CESTCMP to cause a first explosion, thereby performing one compression starting. Thereafter, the program proceeds to Step 306 to reset the one compression starting allowance flag X1CMP, and this routine is ended.

In this embodiment explained above, the cylinder on the compression stroke upon the stop is predicted during the process for stopping the engine by the idle stop, and fuel is injected to the cylinder, which is predicted to be the cylinder on the compression stroke upon the stop, during the intake stroke immediately before the stop, whereby the engine is stopped with the air-fuel mixture inhaled and sealed in the cylinder, and the cylinder on the compression stroke in which the air-fuel mixture is sealed is fired to cause a first explosion at the restart after that. Therefore, the first explosion can be generated during a short period of time such as one stroke from the start of the cranking, whereby the starting can be completed during a short period of time. Further, different from the injection asynchronous with the starter, fuel is not injected to the cylinder that does not contribute to the combustion, whereby there is no chance to deteriorate the exhaust emission upon the start.

Moreover, a compression starting that cannot be realized by a conventional idle stop system can be realized by applying the present invention to the idle stop system like this embodiment. Therefore, a demand for shortening the starting time can be satisfied and the feeling of slowness at the restart is not given to a driver. Further, the noise due to the driving sound of the starter can be reduced, thereby satisfying the demand for silence.

However, the present invention is not limited to the idle stop system. The present invention can also be applied to the case where a driver operates an ignition switch to stop or start the engine.

Further, the present embodiment performs a stopping position control wherein the engine stopping position is controlled to be the point after the intake valve of the cylinder that is on the compression stroke upon the stop is closed and before the predetermined crank angle that can secure combustion pressure for the first explosion at the next starting. Accordingly, the air-fuel mixture can surely be sealed in the cylinder on the compression stroke upon the stop. Further, this can reduce the leakage or reduction of the air-fuel mixture in the cylinder on the compression stroke upon the engine stop and the air-fuel mixture in the cylinder on the compression stroke can sufficiently be compressed at the next starting, whereby a first explosion having sufficient combustion pressure can be generated, thereby being capable of surely realizing one compression starting.

However, the present invention may have a configuration wherein the stopping position control is not executed. In this case, only in case where the engine stopping position is predicted to be the point after the intake valve of the cylinder that is on the compression stroke upon the stop is closed and before the predetermined crank angle that can secure combustion pressure for the first explosion at the next starting, fuel is injected to the cylinder on the compression stroke upon the stop to seal the air-fuel mixture therein to thereby perform one compression starting based on the predicted result of the engine stopping position.

Further, even in case where the stopping position control is executed, the intake air amount in the cylinder on the compression stroke may be increased by using other intake air amount control means (e.g., electronic throttle valve, variable valve mechanism or the like), instead of the ISC valve 17. Moreover, the prediction method of the cylinder on the compression stroke upon the stop may suitably be changed.

Besides, the present invention is not limited to a four-cylinder engine, but it may be applied to be embodied to an engine having not more than three cylinders or not less than five cylinders. Further, it is needless to say that the present invention is not limited to an intake port injection engine, but can be applied to a direct injection engine or lean burn engine.

What is claimed is:

1. An engine stopping and starting control device comprising:
   prediction means for predicting a cylinder that will be on a compression stroke upon stopping during a process for stopping an engine;
   control means for controlling a fuel injection upon engine stopping that injects fuel into the predicted cylinder during the process for stopping the engine to seal an air-fuel mixture therein; and
   start control means that fires the predicted cylinder to generate a first explosion to start the engine during a subsequent engine starting operation.

2. The engine stopping and starting control device according to claim 1, further comprising:
   stopping position control means for controlling an engine stopping position to coincide with a point after an intake valve of the predicted cylinder is closed and before the passage of a further predetermined crank angle for securing a combustion pressure for the first explosion of a subsequent engine starting operation.

3. The engine stopping and starting control device according to claim 2, wherein the stopping position control means;
   increases an intake air amount while the predicted cylinder is in an intake stroke immediately before the engine stops, and the compression pressure of the predicted cylinder is thereby increased to stop revolution of the engine.

4. The engine stopping and starting control device according to claim 1, wherein during the process for stopping the engine, the prediction means:
   calculates a motion parameter representing motion of the engine,
   calculates a hindering parameter hindering motion of the engine,
   predicts a future parameter representing a future motion of the engine based on the motion and hindering parameters, and
   predicts a cylinder that will be on the compression stroke upon stopping based on the predicted value of the future parameter.

5. The engine stopping and starting control device according to claim 3, wherein the prediction means:
   predicts a future instantaneous engine speed as the future parameter, and
   when this future instantaneous engine speed is less than or equal to a predetermined value, predicts the stroke state of each cylinder when revolution of the engine is stopped.

6. The engine stopping and starting control device according to claim 1, further comprising:
- automatic stop means for stopping fuel injection and ignition to stop revolution of the engine when a predetermined automatic stop condition is established during idling, wherein,
- the prediction of the cylinder on the compression stroke by the prediction means and the fuel injection control upon the stop by the control means are executed when the engine is stopped by the automatic stop means, and
- the start control means starts control when a predetermined automatic start condition is established while the engine is stopped by the automatic stop means and fires the predicted cylinder to generate the first explosion to restart the engine.

7. An engine stopping and starting control method comprising:
- predicting a cylinder that will be on a compression stroke upon stopping during a process for stopping an engine;
- controlling a fuel injection upon engine stopping that injects fuel into the predicted cylinder during the process for stopping the engine to seal an air-fuel mixture therein; and
- firing the predicted cylinder to generate a first explosion to start the engine during a subsequent engine starting operation.

8. The engine stopping and starting control method according to claim 7 further comprising:
- controlling an engine stopping position to coincide with a point after an intake valve of the predicted cylinder is closed and before the passage of a further predetermined crank angle for securing combustion pressure for the first explosion of a subsequent starting operation.

9. The engine stopping and starting control method according to claim 8 wherein:
- an intake air amount is increased while the predicted cylinder is in an intake stroke immediately before the engine stops, and compression pressure of the predicted cylinder is thereby increased to stop revolution of the engine.

10. The engine stopping and starting control method according to claim 7 wherein during the process for stopping the engine:
- a motion parameter is calculated representing motion of the engine,
- a hindering parameter hindering motion of the engine is calculated,
- a future parameter is predicted representing a future motion of the engine based on the motion and hindering parameters, and
- a cylinder is predicted that will be on the compression stroke upon stopping based on the predicted value of the future parameter.

11. The engine stopping and starting control method according to claim 10 wherein:
- a future instantaneous engine speed is predicted as the future parameter, and
- when this future instantaneous engine speed is less than or equal to a predetermined value, the stroke state of each cylinder is predicted when revolution of the engine is stopped.

12. The engine stopping and starting control method according to claim 7, further comprising:
- stopping fuel injection and ignition to stop revolution of the engine when a predetermined automatic stop condition is established during idling, wherein:
- the prediction of the cylinder on the compression stroke and the fuel injection control upon the stop are executed when the engine is stopped, and
- start control begins when a predetermined automatic start condition is established while the engine is stopped and the predicted cylinder is fired to generate the first explosion to restart the engine.

* * * * *